(12) United States Patent
Lamparter et al.

(10) Patent No.: US 11,099,548 B2
(45) Date of Patent: Aug. 24, 2021

(54) SUGGESTING AND/OR CREATING AGENTS IN AN INDUSTRIAL AUTOMATION SYSTEM

(71) Applicant: Siemens Aktiengesellschaft, Munich (DE)

(72) Inventors: Steffen Lamparter, Feldkirchen (DE); Ingo Thon, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 670 days.

(21) Appl. No.: 15/956,426

(22) Filed: Apr. 18, 2018

(65) Prior Publication Data

US 2018/0307214 A1    Oct. 25, 2018

(30) Foreign Application Priority Data

Apr. 21, 2017  (EP) .................................. 17167562

(51) Int. Cl.
*G05B 19/418*       (2006.01)
*G05B 17/02*        (2006.01)
(Continued)

(52) U.S. Cl.
CPC ....... *G05B 19/41835* (2013.01); *G05B 17/02* (2013.01); *G05B 19/0426* (2013.01);
(Continued)

(58) Field of Classification Search
CPC .......... G05B 19/41835; G05B 19/4183; G05B 19/41885; G05B 17/02; G06K 9/00; G06K 9/6218; G06K 9/00718
See application file for complete search history.

(56) References Cited

U.S. PATENT DOCUMENTS

2010/0083223 A1*  4/2010  Chouinard ................ G06F 8/52
                                                    717/110
2014/0039834 A1   2/2014  Shibuya et al.
(Continued)

FOREIGN PATENT DOCUMENTS

DE      102010043651        3/2012
DE      102014208034       10/2015
(Continued)

*Primary Examiner* — Khoi H Tran
*Assistant Examiner* — Tanner L Cullen
(74) *Attorney, Agent, or Firm* — Cozen O'Connor

(57) ABSTRACT

An automation system, a method and an apparatus for suggesting and/or creating an agent in an industrial automation system that includes automation devices having a framework which is formed to execute the agent and which at least partially includes a data source that collects and/or processes data of the automation devices, and includes a data sink, in which data, in particular status data, of the data sources is saved, wherein an agent suggestion component processes data of the data sink into clusters via a cluster analysis, and wherein the agent suggestion component makes the clusters available at an interface such that a model for the agents becomes creatable by an agent generation component based on at least one selection of the clusters such that it becomes possible to suggest and/or create agents in a simpler and more efficient manner.

21 Claims, 2 Drawing Sheets

(51) Int. Cl.
  G05B 19/042  (2006.01)
  G05B 19/05  (2006.01)
  G06K 9/62  (2006.01)
  G06N 20/00  (2019.01)

(52) U.S. Cl.
  CPC ....... G05B 19/056 (2013.01); G05B 19/4183 (2013.01); G05B 19/4186 (2013.01); G05B 19/41845 (2013.01); G05B 19/41885 (2013.01); G06K 9/622 (2013.01); G06K 9/6264 (2013.01); G06N 20/00 (2019.01); G05B 2219/31318 (2013.01); G05B 2219/34416 (2013.01)

(56) References Cited

U.S. PATENT DOCUMENTS

| | | | |
|---|---|---|---|
| 2014/0047107 A1 | 2/2014 | Maturana et al. | |
| 2015/0332167 A1* | 11/2015 | Kaushal | G06F 30/20 706/12 |
| 2016/0054720 A1 | 2/2016 | Lo et al. | |
| 2016/0274553 A1* | 9/2016 | Strohmenger | G05B 17/02 |
| 2017/0046309 A1 | 2/2017 | Hubauer et al. | |
| 2017/0102678 A1* | 4/2017 | Nixon | G05B 19/4185 |
| 2019/0198136 A1* | 6/2019 | Hou | G06N 7/005 |

FOREIGN PATENT DOCUMENTS

| | | |
|---|---|---|
| EP | 3001266 | 3/2016 |
| EP | 3070554 | 9/2016 |
| EP | 3156941 | 4/2017 |
| WO | WO2017/027012 | 2/2017 |

\* cited by examiner

SUGGESTING AND/OR CREATING AGENTS IN AN INDUSTRIAL AUTOMATION SYSTEM

BACKGROUND OF THE INVENTION

1. Field of the Invention

The invention relates to a method for suggesting and/or creating at least one agent in an industrial automation system, relates to an apparatus for performing the method, relates to an automation system with the apparatus as well as to an automation device having a framework, which is configured to execute an agent.

In this context, agents are understood to mean programs that are responsible for a limited technical field of activities in an automation system. They may be formed as a (software) unit, in order to ensure autonomous behavior to achieve the defined objective, may be configured for interaction with the surroundings and/or with other agents and may be capable of maintaining an internal status on a long-term basis. Agents of this kind are, for example, the subject matter of the VDI/VDE 2653 series of guidelines and of the VDI/VDE technical committee 5.15: agent systems.

2. Description of the Related Art

An agent may, in a pump system, for example, monitor the formation of undesirable cavitation based on the data from various sensors available to it (e.g., flow volume and/or rate, pressure, or temperature) and, if necessary, adopt measures and/or perform a corresponding alert. Agents may also be formed as "apps", which run on a framework configured specifically therefor on the automation devices and are distributed on a central app management (e.g., app store).

Previously, the creation of agents has been a highly cost and labor intensive process. To this end, existing processes require a considerable amount of human interaction, primarily for the steps of collecting data, programming the agent and for deploying the actual agent.

US2016/0054720 A1 discloses an intelligent programmable control (programmable logic controller, (PLC)), where the intelligent PLC performs data analyses and a contextualization of data itself.

WO 2017/027012 A1 discloses a method for operating an intelligent programmable logic controller (PLC) in an automation system of a production process, where the intelligent PLC receives control data of the automation system as well as a semantic context model and where the context model contains a plurality of ontologies, which contain formal specifications of conceptual units that are associated with the automation system.

SUMMARY OF THE INVENTION

It is an object of the present invention to provide a method for modern automation systems, which makes it possible to suggest and/or to create the agents cited in the introduction in a simpler and more efficient manner. It is also an object of the invention to provide an apparatus for performing the method as well as an automation system with an apparatus.

These and other objects and advantages are achieved in accordance with the invention by a method for suggesting and/or creating at least one agent in an industrial automation system, where the industrial automation system includes automation devices, which at least partially have a data source, where the data sources collect, forward and/or process data of the automation devices, and a data sink, in which data, in particular status data, of the data sources is saved.

An agent suggestion component processes the data of the data sink into clusters via a cluster analysis and makes the clusters available at an interface such that a model for the agents can be created via an agent generation component based on at least one selection of the clusters.

Cluster analyses are understood to mean methods for discovering similarity structures in large data pools. These include supervised or unsupervised machine learning methods, such as k-means or DBSCAN. The cluster analysis results in clusters. The advantage here is that the analysis of the data can be performed in a fully automated manner. Supervised learning would be beneficial if data is already present in a contextualized format. Unsupervised learning algorithms make it possible to find similarity structures even in data which has not yet been contextualized. Here, the clusters found can be analyzed by an expert in the area of the automation system and agents can be generated from the clusters found in a convenient manner.

In this context, clusters are groups of similar data points or data groups, which are formed by a cluster analysis.

In the context of the invention, data means any data and/or status data that accumulates in the automation system. Here, any measured values of physical or virtual variables, count values of discrete procedures, such as quantities produced or errors in the system, are conceivable. The data is ideally present in a contextualized format. Particularly advantageously, however, the inventive method is equally suitable for non-contextualized data. Data may be present in formats, such as JSON, XML or proprietary industrial formats. It is likewise conceivable for the data already to be compressed in the data source.

The context of data, often also referred to as semantics or metadata, which may be present as context data, contains the information regarding the context of the data from the data source which can be utilized for the evaluation. In simple cases, this may involve the unit of a measured variable, but this may also involve more complex information, such as the type of a sensor/actuator, the units of the variables measured, the installation position of the sensor/actuator, the environment of the sensor/actuator or further information that could be of importance in an industrial environment. The data is contextualized by context data.

Here, data sources are apparatuses or components that collect and/or prepare data, in particular status data of the automation devices. It is conceivable in this context that individual automation devices have no data source, but their data is collected/prepared by a data source of another, e.g., higher-level automation device. These may involve specific communication stacks, which prepares data already in meaningful formats and forwards it accordingly. The CPUs of the automation devices may also be formed as data sources or may contain such a data source. Data sources may also be retrofitted in existing automation systems, or the existing data structures may be diverted into partly central data sources. There are always diverse products for this purpose, in particular from the area of the "Industry of Things".

Automation devices are all devices which, in principle, can deliver data in an automation system. In particular, the automation devices include field devices, sensors, actuators, controllers, and even, e.g., purely mechanical actuators (e.g., valves), which have been subsequently equipped with sensor technology and a data interface. Thus, the data may also be the simplest status information such as Boolean operators, e.g., a valve which only has two positions (open and closed). In doing so, the context information would be the fact that this relates to a valve and which of the two statuses represents the blocked status.

A data sink for saving data from the automation system may be, for example, a locally or decentrally arranged server or a server farm or cloud storage. The data sink must not be arranged at the same site as the automation devices and/or the data sources, but in particular may also be arranged in a remote computer center. Here, the data does not need to be saved from the automation system in real time, but rather can also be filed in batch jobs at certain intervals.

The data sink can archive the data over a predefinable time frame. Here, it is conceivable for the data sink to hold the data only until a cluster analysis has been performed. If a current cluster analysis has thus been performed, it is conceivable for the data to be deleted from the data sink of the automation system, in order to create storage space. It is also conceivable, however, for the data sink to serve only as an intermediate storage for a higher-level storage system. Not all data has to be analyzed in the data sink; it may prove useful to only select particular data, e.g. based on the tasks of the desired agent. Here, a digital design specification for the agent to be created could be incorporated, for example.

In straight-forward cases, via the selection, e.g., of a part of the clusters, a mathematical relationship may be recognized based on the bounds in which the values of the clusters are located, from which a mathematical model can be generated. While doing so, bounds are conceivable, for example, where exceeding or falling below the bounds indicates a corresponding status of the system/the component, in order for the agent to then trigger an alarm signal as a result. The selection of the clusters is the step, at which it is determined which information should be used for the creation of the agent. It is possible for this step to be performed both automatically and manually or semi-automatically with the support of the system or the interface.

In one embodiment, the selection can be created manually. To this end, the interface can be formed as a Human Imaging Interface (HMI). An HMI, in the context of the invention, is any device that enables an interaction of a human operator with the interface. Here, any terminal devices such as PCs, laptops, smartphones, tablets or even industrial HMIs in the traditional sense are conceivable. The expert in the technical field, in which the automation system can be found, is presented with the structures found by the cluster analysis and the expert can conveniently use their domain knowledge to select the clusters whose information offers added value. As a further functionality of the agent, corresponding measures, alarms or messages may then be linked to the model that depicts the selection.

In a further embodiment, the selection is created automatically or at least semi-automatically. If empirical values from comparable automation systems already exist, it is then conceivable for the quantity of created clusters to be compared against the empirical values. In this manner, the interaction by the domain expert can be reduced further still. In doing so, it is conceivable for the domain expert to only act as a quality assurance stage.

In an advantageous embodiment, the model for the agent is created via a supervised learning algorithm. Supervised learning algorithms are understood to mean supervised machine learning algorithms that enable the agents to depict the principles indicated in the clusters. Methods such as Support Vector Machine Training (aka SVM Training) or logistical regression are especially suitable, here. If the model parameters cannot be created directly from the bounds that delimit the clusters, then it is advantageous to analyze the data of the selected cluster or the data of the selection via a supervised learning algorithm. In this case, a corresponding model can be created, which depicts the selection of the clusters. In this way, even considerably more complex relationships which, for example, cannot be solely represented in two or three dimensions, but rather entail n-dimensional relationships, can likewise be depicted via a model for a corresponding agent.

In a further embodiment, the model is a mathematical and/or a status-based model. This is advantageous in that many existing systems are able to process such mathematical and/or status-based models directly.

In a further embodiment, the interface prepares the clusters for manual selection. Here, it is conceivable that a user interface prepares the clusters found such that the user can make their selection directly based on the data points processed into clusters and can directly assign a corresponding function for the agent in the following step. This can occur in a representation in two or three dimensions. Colored highlights for the individual clusters are also conceivable.

In a particularly advantageous embodiment, the clusters and/or the agent are created while taking into consideration context data. This allows an increased degree of automation, because the clusters can already be created based on the context and, thus, agents can be created in a targeted manner. In this context, context data can be obtained from various engineering solutions. Also conceivable are interfaces from what is known as plant engineering software.

In a further advantageous embodiment, the agent suggestion component processes the data into clusters based on context data. The context data can also be called upon for the cluster analysis, as with the data.

In a further advantageous embodiment, the agent suggestion component structures the clusters based on context data. Here, the clusters are advantageously created based on a cluster analysis of the data and, in a further step, a structuring of the clusters is undertaken based on the context data. In so doing, position data of the automation devices, environmental data, device types or simply types of physical data, for example, i.e., only the flow rate, for example, can be structured and prepared accordingly.

In a further advantageous embodiment, the data sources provide the data with context data. For the subsequent clusters, it is particularly advantageous if the data sources already attach their knowledge of the context to the data in the form of metadata or even context data. This enables a more efficient clustering or even the recognition of entirely new structures in the cluster analysis.

In a further advantageous embodiment, the data sources communicate via an industrial protocol, in particular via of a universal industrial protocol. In doing so, it is conceivable for a universal industrial protocol already to undertake a compression of the data and/or a preselection of the data. This has the advantage that less storage space is required in the data sink, and most of all that the traffic over the network is kept clear for the actual automation tasks.

In a further advantageous embodiment, the data sources are formed as a universal communication stack, which communicates via a universal industrial communication protocol. Here, universal industrial communication protocols are understood to mean known protocols, such as PROFINET, PROFIBUS, or Object Linking and Embedding for Process Control Unified Architecture (OPC UA). Likewise, communication protocols are conceivable that perform a contextualization of the data including a historicization, as is partially already the case with OPC UA.

It is likewise conceivable for data to be "labeled" manually, i.e., to already be provided with a label during engineering, for example, in which label the context data is contained. A supervised clustering could also be used for a labeling.

In a particularly advantageous embodiment, the data sources select the data based on context data. In order to reduce the quantity of data to be transferred to the data sink and to increase the quality, it is conceivable that a preselection already occurs based on the context information, which may be available in an automation device or the data sources thereof, in order to focus on the correct data. This simplifies the subsequent cluster analysis, as irrelevant data does not have to be included in the processing. To this end, the data source may obtain the context data from a higher-level system. This can occur beforehand during the configuration or even during the running operation.

In a further embodiment, an archiving or a preprocessing of the data can be performed by the data sources for a predefinable time frame. This has the advantage that the actual transfer of the data, which is then already present in a prepared format, can occur at points in time in which the production or the industrial network has a lower load.

In a particularly advantageous embodiment, the agent generation component creates an agent and makes it available in the automation system as an executable binary file and/or as a compatible mathematical model. This may occur in an "app store". It is likewise conceivable for the agent to be filed as a docking container via a virtualized operating system in a container.

It is also an object of the invention to provide an apparatus for suggesting and/or creating agents in an industrial automation system according to the inventive method, wherein the industrial automation system includes automation devices, which at least partially have a data source, where the data sources are configured to collect and/or process data of the automation devices, and a data sink, which is configured to save the data of the data source.

The apparatus has an agent suggestion component, which is configured to process the data from the data sink into clusters via a cluster analysis and the agent suggestion component has an interface and the clusters are made available at the interface such that a model for the agents can be created via an agent generation component, based on at least one selection of the clusters.

Here the apparatus may be configured as a software component on a PC or industrial PC. The agent suggestion and generation components may also, depending on computing effort and data volume, be outsourced in a computer center. A fully decentralized, distributed architecture is also conceivable.

It is a further object of the invention to provide an automation system, wherein the automation system includes automation devices, which at least partially have a data source, where the data sources are configured to collect and/or process data of the automation devices, a data sink, which is configured to save the data of the data sources, as well as an apparatus in accordance with the invention.

It is a further object of the invention to provide an automation device having a framework, where the framework is configured to execute an agent created and/or suggested via the method in accordance with the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is described and explained in more detail below with reference to the exemplary embodiments illustrated in the figures, in which.

DETAILED DESCRIPTION OF THE EXEMPLARY EMBODIMENTS

Figure 1:
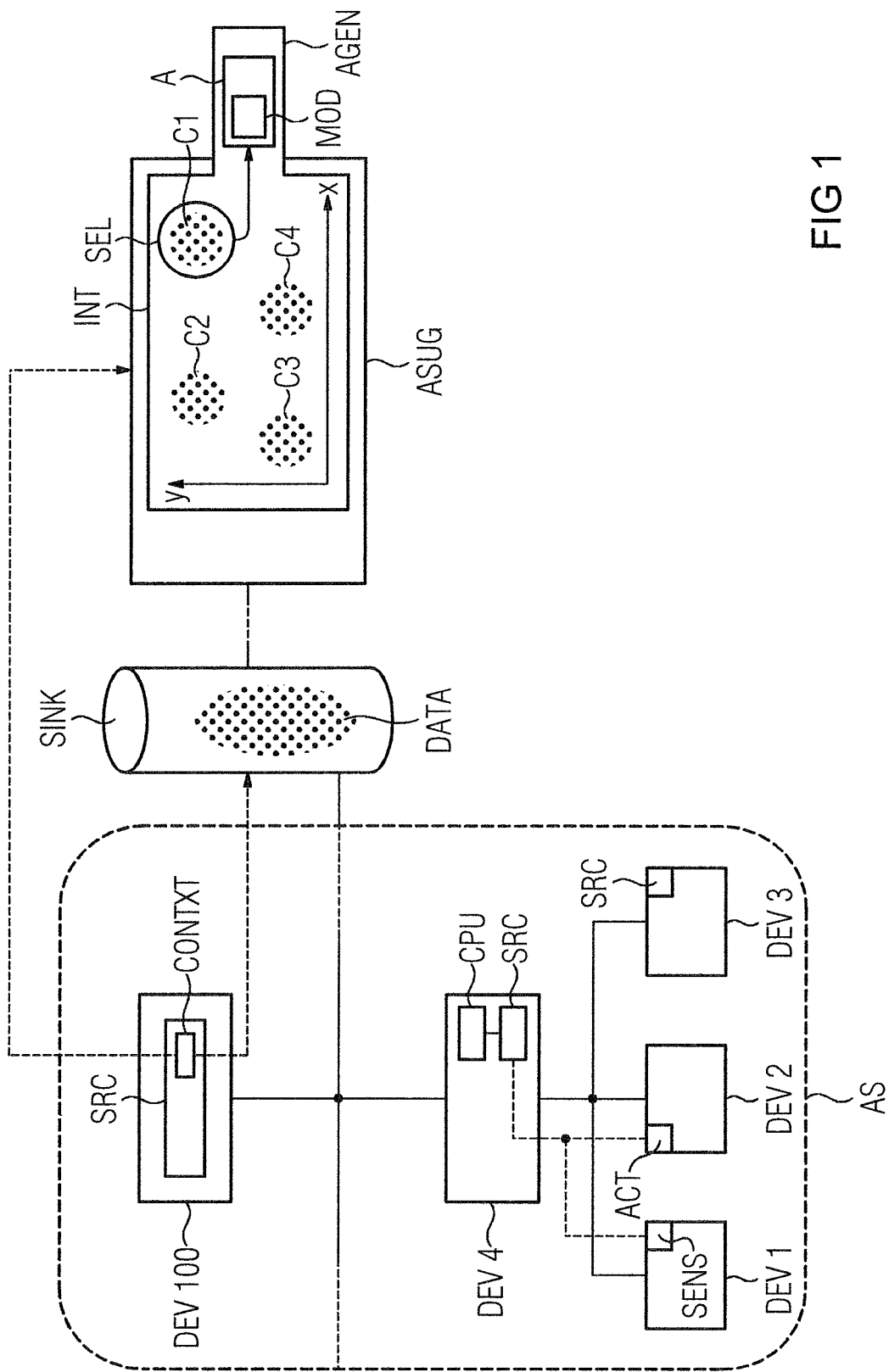
FIG. 1 shows an automation system, in which a method for suggesting and/or creating agents is implemented in accordance with the invention.

With reference to FIG. 1, the automation system AS has a plurality of automation devices DEV. Lower-level automation devices DEV1, DEV2, DEV3 are each connected to the rest of the automation system AS via a higher-level automation device DEV4. The higher-level automation device DEV4 has a processor unit CPU, as well as a data source SRC. The data source SRC is connected to the processor unit CPU, which is already able to perform calculations of data DATA in the data source SRC. The lower-level automation device DEV3 has an autonomous data source SRC. This may either communicate with the data sink SINK illustrated outside the automation system, in this instance directly, or likewise may communicate via the higher-level automation device DEV4 and the data source SRC thereof. The two lower-level automation devices DEV1, DEV2 do not have their own data sources SRC. These have a sensor SENS and an actuator ACT, which are connected to the data source of the higher-level automation device DEV4 separately via a dashed connection. The dashed line serves to indicate that the sensor SENS and the actuator ACT involve "intelligent devices", which communicate directly with a data source using a corresponding protocol. It is also conceivable, however, that the necessary data DATA of the data source SRC is provided via the conventional industrial protocol communication channel. The automation device DEV100 is an automation device of the highest level illustrated; this may involve a higher-level industrial controller or a SCADA system, for example. A data source SRC is also present here, which in this case contains context data CONTXT. This context data CONTXT may either be fed to the data sink SINK directly, but it is also equally conceivable for the context data CONTXT to be fed to an agent suggestion component ASUG directly and to be available there. This is illustrated by a dashed arrow in each case.

In addition to the data sink SINK, which contains data DATA from the automation system AS, the agent suggestion component ASUG can be seen, which in turn has an interface INT to an agent generation component AGEN. In the agent generation component AGEN, an agent A can already be seen, which has been created based on a model MOD. The interface has prepared four clusters C1, ..., C4 and represents these in a dimension X and a dimension Y. The model MOD has been created, based on a selection SEL, in this case the entire cluster C1. The representation of the dimensions C, Y should only be considered as exemplary, here. Any graphical representations for manual selection, which make it possible for a user to recognize data structures in the clusters and to make a meaningful selection SEL according to the tasks of the agent A to be defined, are conceivable. Not only individual clusters have to be selected, but rather a plurality of clusters, which cover various cases with a selection SEL and are then depicted in a single agent A, may also be beneficial.

It should be understood the interface INT may also offer the dimensions X, Y, shown here as a graphical interface, in a manner without graphical preparation, such that corresponding structures are found in the data already present in clusters via a supervised learning algorithm, and these structures can then be used for agent generation automatically.

It is thus conceivable for the agent suggestion component AGEN to suggest a variety of different agents A, e.g., via corresponding clusters C, automatically and the expert selects that which offers information useful to him. This useful information may entail thoroughly novel connections that previously were not yet known. The expert can assign the agent A corresponding functions and make the agent available in an application library, such as in a piece of engineering software.

In summary, the disclosed embodiments of the invention relate to a method and an apparatus for suggesting and/or creating at least one agent A in an industrial automation system AS, where the industrial automation system AS includes automation devices DEV, which at least partially have a data source SRC, where the data sources SRC collect and/or process data DATA of the automation devices DEV, and a data sink SINK, in which data DATA, in particular status data, of the data sources SRC is saved.

In order to provide a method for modern automation systems, which makes it possible to suggest and/or to create the agents cited in the introduction in a simpler and more efficient manner, an agent suggestion component ASUG is utilized, which processes data DATA of the data sink SINK into clusters C via a cluster analysis CA and where the agent suggestion component ASUG makes the clusters C available at an interface INT such that a model MOD for the agents A can be created via an agent generation component AGEN based on at least one selection SEL of the clusters C.

Figure 2:
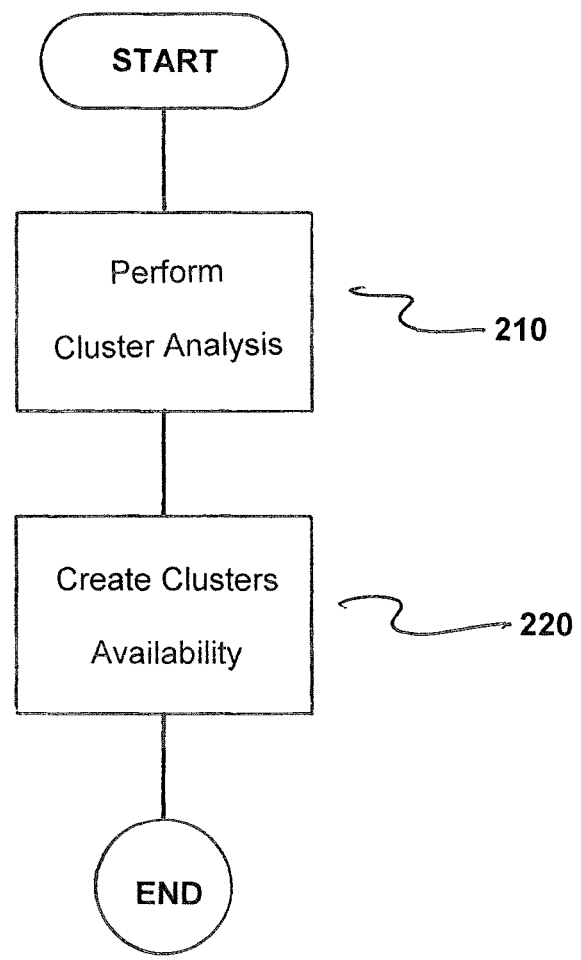
FIG. 2 is a flowchart of the method in accordance with the invention.

FIG. 2 is a flowchart of a method for suggesting and/or creating at least one agent A in an industrial automation system AS including automation devices DEV which at least partially have a data source SRC which either collects and/or processes data DATA of the automation devices DEV, and includes a data sink SINK, in which data DATA of the data source SRC is saved.

The method comprises performing cluster analysis CA by an agent suggestion component ASUG to process the data DATA of the data sink SINK into clusters C, as indicated in step 210.

Next, the clusters C are made available at an interface INT by the agent suggestion component ASUG such that a model MOD for the at least one agent A becomes creatable via an agent generation component AGEN based on the at least one selection SEL of the clusters C, as indicated in step 220.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for at least one of suggesting and creating at least one agent in an industrial automation system including automation devices which at least partially have a data source which at least one of collect and process data of the automation devices, a data sink, in which data of the data source is saved, the method comprising:
   performing cluster analysis by an agent suggestion component within the industrial automation system to process the data of the data sink into clusters; and
   making the clusters available at an interface by the agent suggestion component within the industrial automation system such that a model for the at least one agent system becomes creatable via an agent generation component based on an at least one selection of the clusters.

2. The method as claimed in claim 1, wherein the at least one selection is created manually.

3. The method as claimed in claim 1, wherein the at least one selection is created automatically or at least semi-automatically.

4. The method as claimed in claim 1, wherein the model for the at least one agent is created by a supervised learning algorithm.

5. The method as claimed in claim 2, wherein the model for the at least one agent is created by a supervised learning algorithm.

6. The method as claimed in claim 1, wherein the model is at least one of (i) a mathematical model and (ii) a status-based model.

7. The method as claimed in claim 1, wherein the interface prepares the clusters for manual selection.

8. The method as claimed in claim 1, wherein at least one of (i) the clusters and (ii) the at least one agent are created while taking into consideration context data.

9. The method as claimed in claim 1, wherein the agent suggestion component processes the data into clusters based on context data.

10. The method as claimed in claim 1, wherein the agent suggestion component structures the clusters based on context data.

11. The method as claimed in claim 1, wherein the data sources comprises a universal communication stack.

12. The method as claimed in claim 1, wherein the data sources provide the data with context data.

13. The method as claimed in claim 1, wherein the data sources communicate via an industrial protocol.

14. The method as claimed in claim 13, wherein the industrial protocol comprises a universal industrial protocol.

15. The method as claimed in claim 1, wherein the data sources preselect the data based on context data.

16. The method as claimed in claim 1, wherein the data sources at least one of (i) archive and (ii) preprocess the data for a predefinable time frame.

17. The method as claimed in claim 1, wherein the agent generation component creates the at least one agent and makes the created at least one agent available in the automation system as at least one of (i) an executable binary file and (ii) a compatible mathematical model.

18. The method as claimed in claim 1, wherein the data comprises status data.

19. An apparatus for at least one of suggesting and creating agents in an industrial automation system, the industrial automation system comprising:
   automation devices which each at least partially have a processor
   wherein the processor at least one of (i) collects and (ii) processes data of the automation devices;
   a data storage configured to save the data of the processor;
   an agent suggester within the industrial automation system which is configured to process the data from the data storage into clusters via a cluster analysis; and
   wherein the agent suggester within the industrial automation system includes an interface and makes the clusters available at the interface such that a model for the agents becomes creatable via an agent generator based on at least one selection of the clusters.

20. An automation system comprising:
   the apparatus as claimed in claim 19;
   further automation devices which at least partially include a further processor; and
   a further data storage configured to save data of the further processer;
   wherein the further processor is configured to at least one of (i) collect and (ii) process data of the further automation devices.

21. An automation device comprising:
   a processor; and
   a data storage;
   wherein the automation device has a framework which is configured to execute an agent at least one of created and suggested by:
      performing cluster analysis by an agent suggester to process data of a data sink into clusters; and
      making the clusters available at an interface by the agent suggester such that a model for the agent becomes creatable via an agent generator within an industrial automation system based on at least one selection of the clusters.

* * * * *